July 7, 1925.
A. E. ROSENBERG
1,545,201
COMBINED MOTION PICTURE CAMERA AND PROJECTOR
Filed May 1, 1922    4 Sheets-Sheet 3
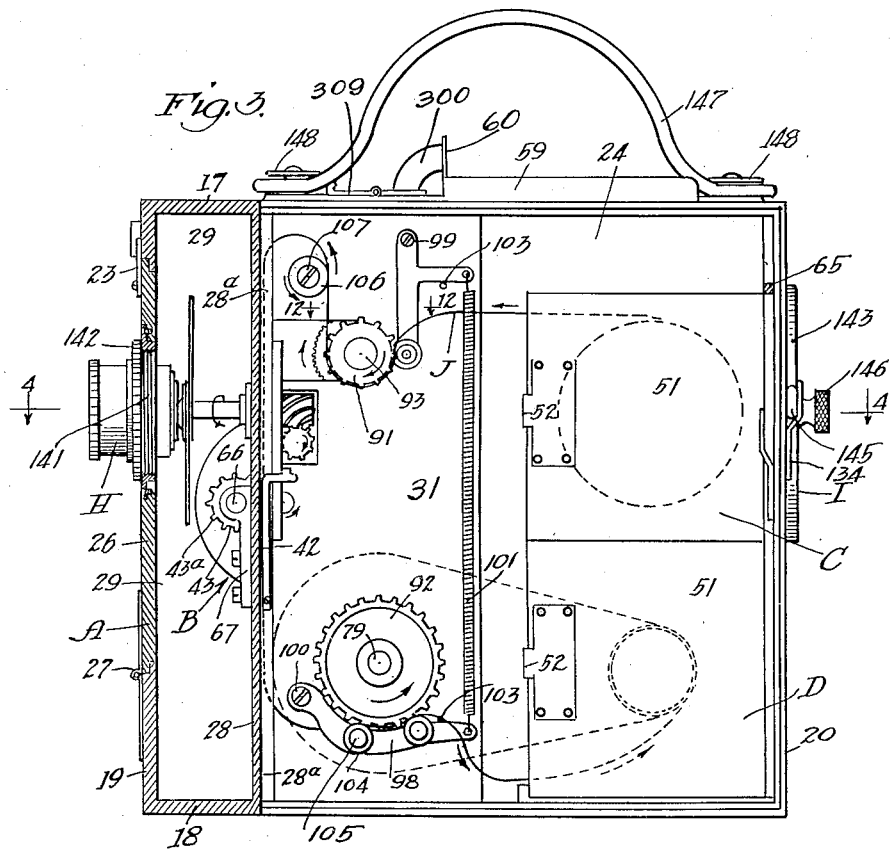
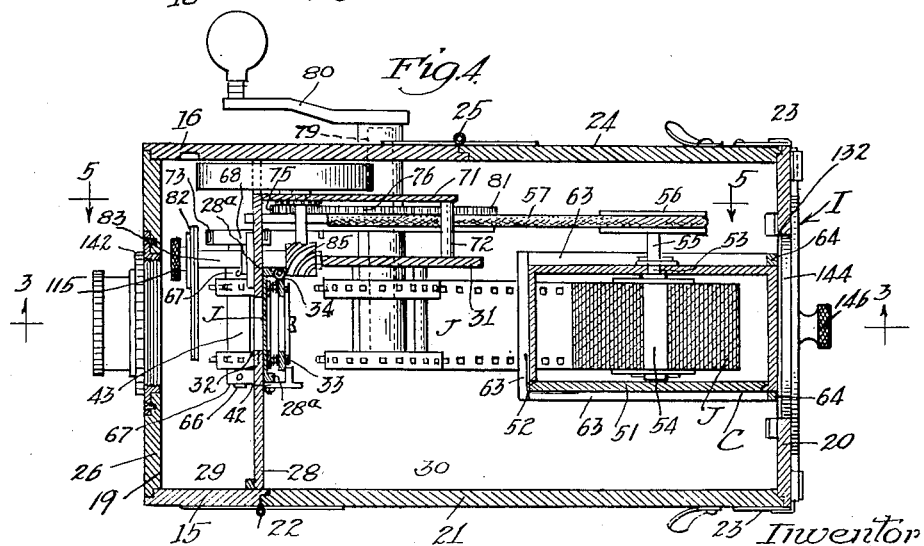
Inventor:
Abe E. Rosenberg
By James T. Barkeley
his Attorney

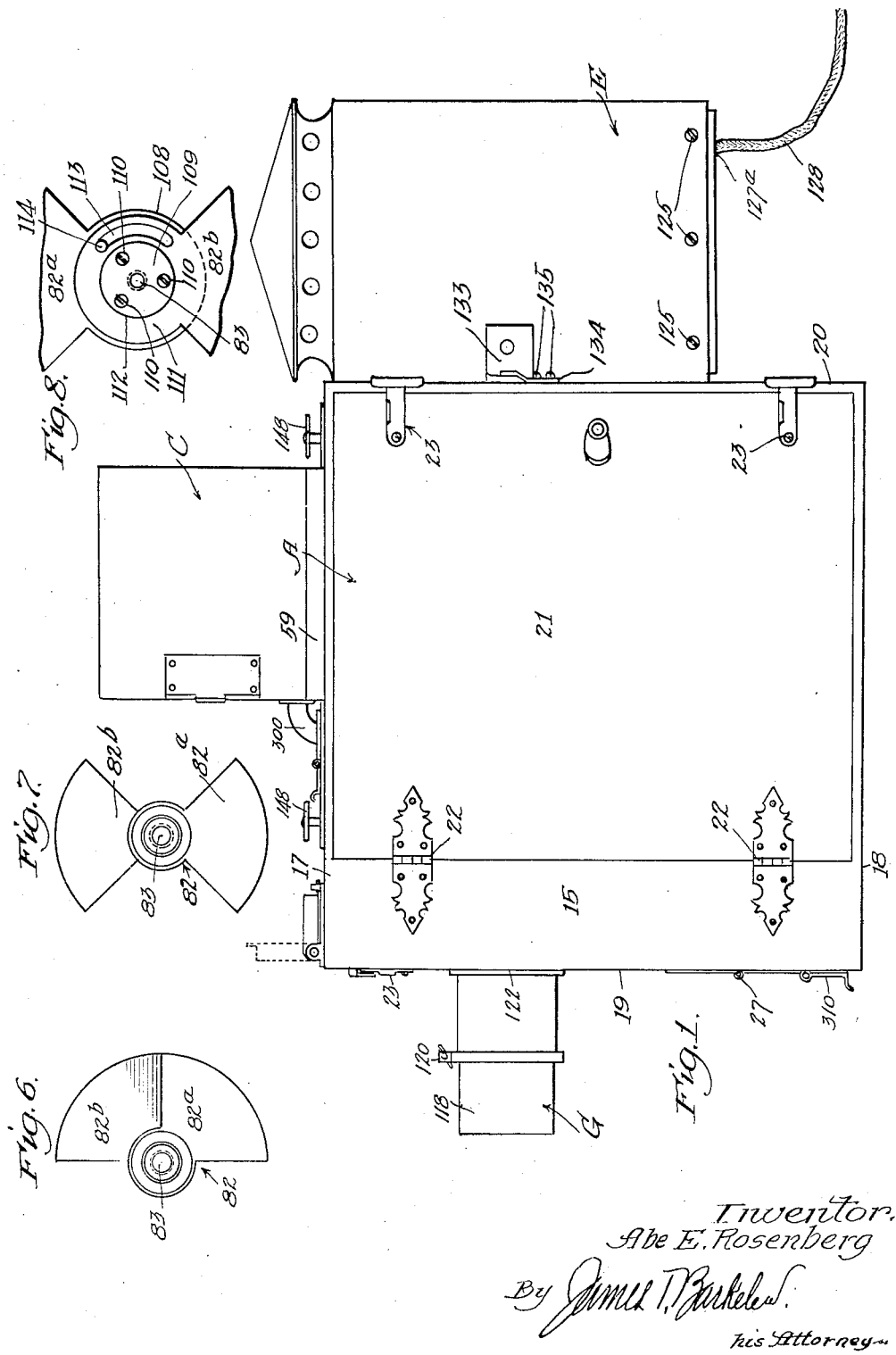

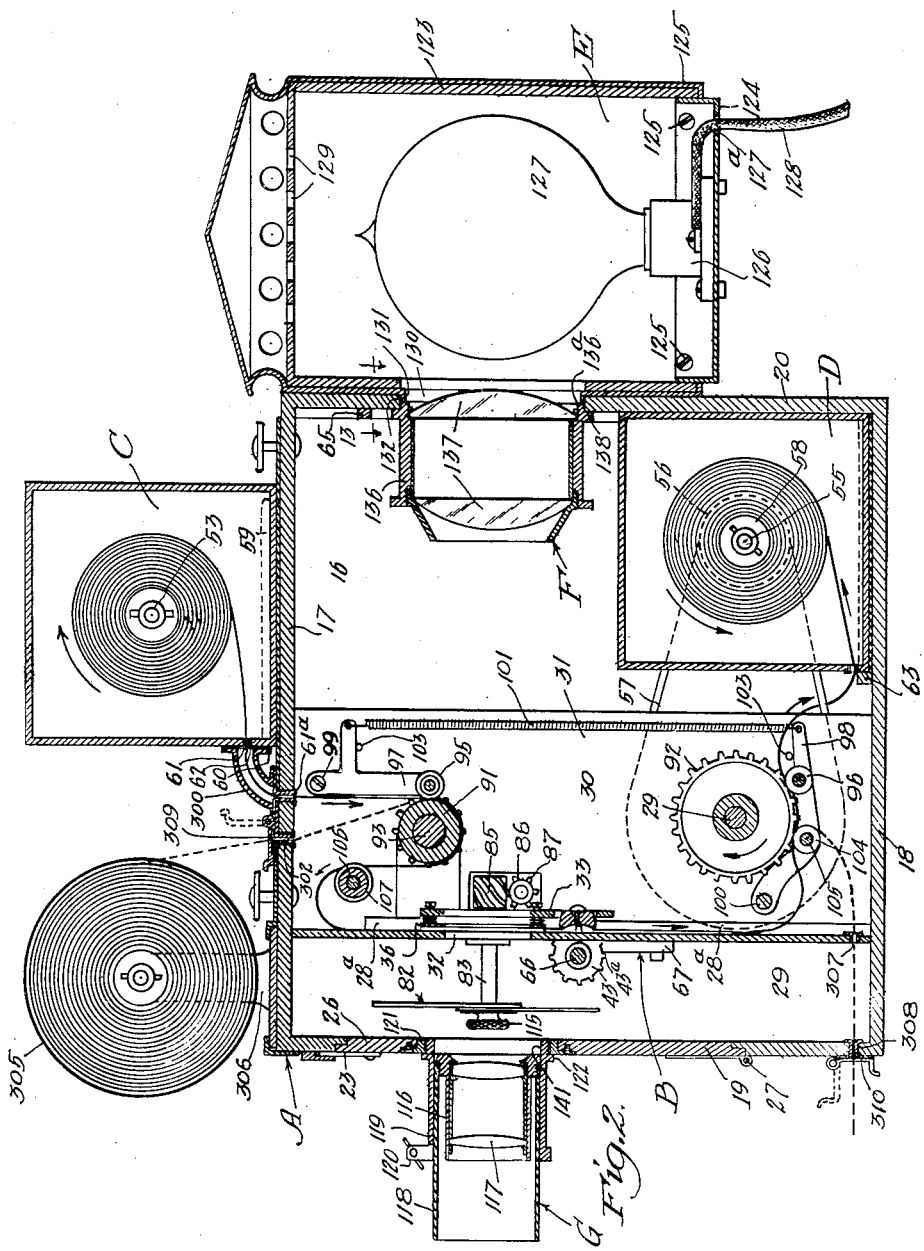

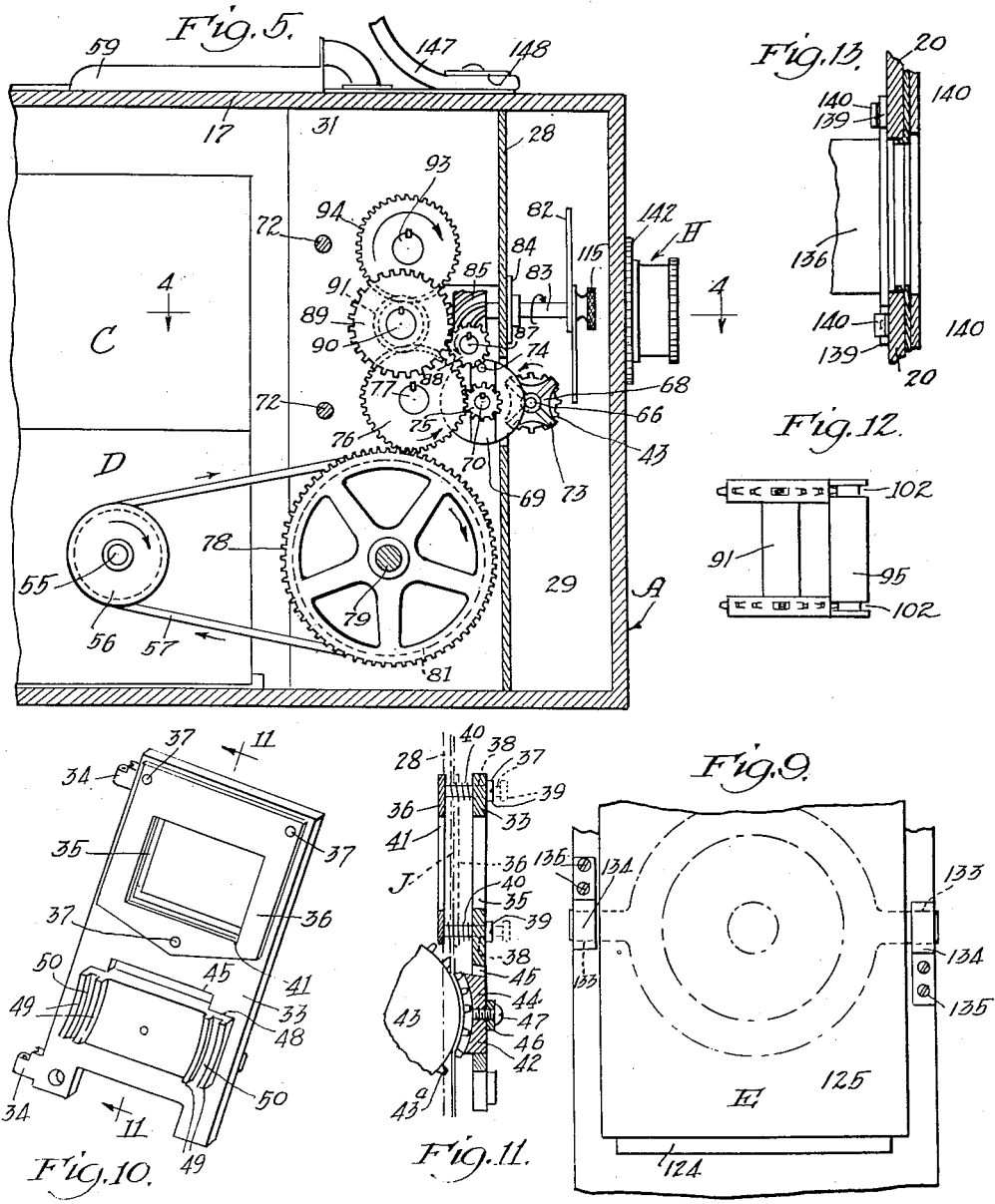

Patented July 7, 1925.

1,545,201

UNITED STATES PATENT OFFICE.

ABE E. ROSENBERG, OF LOS ANGELES, CALIFORNIA, ASSIGNOR OF ONE-HALF TO A. W. MORTON, OF LOS ANGELES, CALIFORNIA.

COMBINED MOTION-PICTURE CAMERA AND PROJECTOR.

Application filed May 1, 1922. Serial No. 557,781.

*To all whom it may concern:*

Be it known that I, ABE E. ROSENBERG, a citizen of the United States, and a resident of the city of Los Angeles, county of Los Angeles, and State of California, have invented new and useful Improvements in Combined Motion-Picture Cameras and Projectors, of which the following is a full, clear, and exact disclosure.

My invention relates generally to motion picture cameras and projectors; while specifically it pertains to a combined camera, projector and printer of that class; the invention being characterized by the utilization of such interchangeable and adjustable parts, in combination with a single film actuating mechanism, to readily and quickly adapt the device for either the taking or projection of motion pictures. It is to be noted in connection with the following description, that the arrangement is also particularly adapted for printing films; so that not only can the films be photographed and projected, but they may also be printed with the same film actuating mechanism.

My foremost object in designing and perfecting the device—as hereinafter disclosed in its preferred specific embodiment—was to provide a simple, compact and inexpensive article, easily transportable, which could be used by amateurs for taking their own motion pictures and then set up in the home for the projection of these pictures. But while the device is admirably suited to the work of amateurs, it is in no sense to be considered as designed for the production of other than results of the highest quality. On the contrary, my arrangement is designed with a view to the accomplishment, with a simple and inexpensive mechanism, of results equal to those by professionals with more expensive and complicated devices.

Another feature of the invention is the compact arrangement of parts and operating mechanism, so the device, as a whole, will occupy a minimum of space for transportation or storage.

Other detailed improvements, in devices of this character, made necessary by my particular compact arrangement, will be more fully described in the following specification.

The device is illustrated, in its preferred specific form, in the accompanying drawings, in which:

Fig. 1 is a side elevation of the device, equipped for the projection of motion pictures; Fig. 2 is a longitudinal vertical section taken through the center of the device, illustrated in Fig. 1; Fig. 3 is a view similar to Fig. 2, only showing the device arranged for the taking of motion pictures, this view being taken as indicated by the line 3—3 of Fig. 4; Fig. 4 is a sectional plan view of the arrangement shown in Fig. 3; the view being taken as indicated by the line 4—4 of that figure; Fig. 5 is a longitudinal vertical section, illustrating a portion of the film actuating mechanism, the view being taken as indicated by the line 5—5 of Fig. 4; Figs. 6, 7, and 8 are detailed views of the shutter; Fig. 9 is a fragmentary rear elevation of the device; Fig. 10 is an enlarged perspective view of the aperture gate; Fig. 11 is a longitudinal vertical section through the aperture gate, the view being taken as indicated by the line 11—11 on Fig. 10; and Fig. 12 is a plan detail of one of the film sprockets and its film guide roller; and Fig. 13 is a detail view taken as indicated by the line 13—13 of Fig. 2.

While I will hereinafter describe the preferred specific arrangement of parts which I have found suitable to the accomplishment of my general purpose, as well as the specific construction and form of those parts, it is nevertheless to be understood that I do not limit myself to such precise arrangement and construction of parts, but prefer to be free to make such changes and modifications in structure and arrangement as will permissibly come within the scope of the appended claims. In other words, I will limit myself to the precise construction and arrangement of parts, herein illustrated and described, more generally for the purpose of explaining, in a clearly understandable manner, the broad aspects of my invention and the results to be obtained thereby.

Referring now to the drawings, the device comprises essentially, a suitable case A containing a film actuating mechanism B, film magazines C and D containing feed and takeup reels, respectively, a lamp housing E containing an illuminant, condenser lens organization F, and a projection lens organization G; all of the foregoing being shown in Figs. 1 and 2 in arrangement for the projection of films. The lamp housing E, condenser lens F and projection lens G, are all removable so the projection lens G may be replaced by a photographing lens H and the light aperture in the rear of the case (from which the lamp housing E and condenser lens F have been removed) covered by a suitable plug I, for the purpose of adapting the device as a camera for the taking of pictures (see Fig. 3). When the device is equipped as a camera, film magazine C is removed from the top of the case A and placed inside, as illustrated in Fig. 3.

I will now proceed to a detailed description of the several parts, as above described, explaining their structures, functions and cooperative relations. The case A may be constructed of any suitable material, preferably light wood, and of any suitable size to conveniently and compactly house the several parts; having sides 15 and 16, top and bottom walls 17 and 18 and front and rear walls 19 and 20, respectively. The side 15 is almost entirely taken up by a door 21, hingedly mounted by means of hinges 22 upon the side 15, and provided with suitable latches 23 for retaining it in closed position. Access may be gained through this door to the interior of the case for the arrangement of the magazines C and D therein, and also for the purpose of properly threading the film J through the operating mechanism B. A somewhat smaller door 24 is likewise hingedly mounted in the side 16,—by means of hinges 25— for gaining access to the opposite side of the case; and in a similar manner a door 26 is hingedly mounted—by means of hinges 27— in the front wall 19 for gaining access to the forward portion of the case for the adjustment of the shutter and other parts, as will be more fully hereinafter explained. Each of the doors 24 and 26 are also provided with suitable latch devices 23, for retaining these doors in closed position.

A partition 28 extends entirely across the case A, and from the top 17 to the bottom 18; being spaced a short distance from the front wall 19 to form a small chamber 29, hereinafter referred to as the exposure chamber, and a relatively large chamber 30, hereinafter referred to as the film chamber. The bulk of the film actuating mechanism B is mounted upon the partition 28; a portion of it being also mounted upon a partition 31; similarly extending from the top 17 to the bottom 18 of the case A, and from the partition 28 back a short distance, to a point about midway of the case in the direction of its length. The partition 31 is spaced a short distance from the side 16, to partially separate the film chamber 30 from a space in which the main, film actuating, gear train is mounted.

In order that a clear understanding may be had of the device, I will first proceed to a detailed description of it as it is arranged for the projection of pictures, describing in detail the arrangement and construction of parts necessary for this work; and thereafter describe the several parts, and manner of their interchangeability for the adaptation of the device for taking of pictures.

An exposure aperture 32, of proper dimensions to make exposures of standard size on standard film, is cut in the partition 28 in axial alignment with the projection lens organization G; the latter being removably mounted in the door 26, as shown in Fig. 2. An aperture gate 33 is hingedly mounted upon the partition 31,—as at 34—within the film chamber 30, to properly hold the film J in close movable contact with the partition 28, around the exposure aperture 32, in the usual manner. This aperture gate 33 is clearly illustrated in Figs. 10 and 11. It is likewise provided with an aperture 35, corresponding substantially in dimensions to the exposure aperture 32, disposed in axial alignment with the latter. The aperture gate 33 is so mounted with relation to the partition 28 that when it is in closed position, as illustrated in the drawings, it will be spaced slightly from the partition 28 to admit of the exertion of a yielding pressure on the film to hold the latter in proper contactual relation to the exposure aperture 32. This yielding film contact is accomplished by means of a pressure plate 36 relatively movably mounted upon the gate 33, its movement relative thereto being in the direction of the axis of the aperture 35. It is thus mounted by means of studs 37 rigidly secured to it and extending loosely through suitable apertures 38, in the gate 33, being limited in its movement away from the gate by means of the stud heads 39. The plate 36 is normally held away from the gate 33 by means of spiral springs 40 surrounding the studs 37 and confined between the adjacent faces of those members. The plate 36 is likewise provided with an aperture 41, of substantially the same dimensions as the apertures 32 and 35, and disposed in axial alignment therewith, as clearly shown in Fig. 11.

When the gate 33 is closed the outer face of the plate 36 around the aperture 41, engages the inner face of the partition 28 surrounding the aperture 32, and the distance between the inner face of the gate 33 and the face of partition 28 is such that the springs 40 will be held under compression, thereby holding the plate 36 in yielding contact with the partition, or with the outer face of the film J, to hold it in contact with the face of the partition around the aperture 32, when the film is mounted therebetween. The manner in which the plate 36 is yieldingly held in contact with the outer face of the film J, to hold the latter in close contact with the exposure aperture 32, is illustrated in dotted lines in Fig. 11. This view shows approximately the position of the plate 36, and the manner in which the springs 40 are held in compression, when the gate 32, is closed, (as shown in the drawings.) The face of the partition 28, against which the film is pressed by plate 36 on gate 33 is smoothly finished to form a raceway; the film being guided in alignment therewith, and the aperture 32, by two guide bars 28ª secured on either side to the partition 28. The gate 33 is held normally closed by a spring catch 42 secured at its lower end to one of the bars 28ª, as shown in Fig. 3.

A block 42, for holding the film J in engageable relation with a film actuating sprocket 43 (the details of which will be more fully hereinafter explained) is mounted upon the aperture gate 33, just below the pressure plate 36. This block extends substantially across the inner face of the aperture gate and has a back lug portion 44 extending into an aperture 45 in the gate; the latter being of such width as to hold the block 42 against transverse movement but being of such height that it is vertically slidable therein. This is to permit the vertical adjustment of the block relative to the perimeter of the sprocket 43; and the adjustment is made by means of a clamp bar 46, removably secured to the rear face of the lug 44 by means of a screw 47; and which bar engages the rear face of the gate 33 on either side of the aperture 45, holding shoulders 48 of the block in contact with the opposite face of the gate. The front face of the block 42 is arcuate, its curvature being on a radius to conform to the periphery and the sprocket 43, but slightly greater so as not to contact with and injure the gelatinous surface of the film. Preferably the radius of this face is slightly greater than the radius of the teeth 43ª, of the actuating sprocket 43. A pair of arcuate parallel ribs 49 are formed on each end of the block 42 (see Fig. 10) so as to form channels 50 therebetween, in which the teeth 43ª of the sprocket 43 travel in actuating the film J. The height of the ribs 49 is substantially that of the teeth 43ª and of slightly greater radius to allow free movement of the teeth in channels 50; the width of the ribs 49 being such as to engage the film on either side of its perforations and hold it in engageable relation with the sprocket 43, yet narrow enough (the inner one at least) so as not to contact with and mar the gelatinous surface of the film. The dotted lines in Fig. 11 illustrate the manner in which the film J passes over the block 42, and is guided by the block 42 for engagement by the teeth of the sprocket 43, in its film actuating movement.

The feed and takeup film magazines C and D, respectively, may be constructed of any suitable material such as light wood, and are preferably square and of such width as to conveniently contain a roll of standard film. Access is gained to the interiors for the insertion and removal of the film through a removable side 51 held in place by means of a spring clip 52 (see Figs. 3 and 4). In the film magazine C a shaft 53 is rigidly secured to the side opposite the cover 51, on which a spool 54 is loosely mounted for carrying the film F, and from which it is drawn by the film actuating mechanism, in its operation. In the magazine D, this being the takeup magazine, the shaft 55 extends through the wall opposite the cover 51, being journalled therein in a suitable bearing and having a pulley rigidly secured to its outer end, which, by means of a suitable belt 57, is driven from the film actuating mechanism (to be hereinafter described) for taking up the film as it is fed from the film actuating mechanism. The shaft 55 carries a spool 58, rigidly fixed thereon, for carrying the film J and reeling it up as it enters the magazine. The magazines C and D are identical in size and configuration, so that they may be interchangeable if desired, and so they may be mounted one on top of the other within the case A, as shown in Fig. 3, when the device is used as a camera. When the device is used as a projector, as shown in Figs. 1 and 2, the magazine C is mounted on the top edge 17 of the case A; being retained thereon by being held between spring flanges 59 turned up along the longitudinal edges of a plate 60 secured to the top face of the edge 17. A flange 60 also extends across the plate between the flanges 59 to engage the forward edge of the magazine C and hold it against the pull of the film as it passes through a slot 61 situated in the forward edge of the magazine and adjacent its bottom, as shown in Fig. 1. This slot 61 is lined and covered with a suitable fabric 62 to prevent injury to the film J, and also to prevent light entering the magazine when the device is being used as a camera. It can be seen that the magazine C is easily removable from and adjusted to the top 17 of the case A merely by extending it between the spring flanges 59 and moving it up against the flange 60 at its forward edge. The takeup magazine D is always mounted within the film chamber 30 of the case A, by resting in a seat, with its rear edge resting against the inner face of the rear edge 20 of the case A, the seat being formed by a bead 63, secured to the bottom 18, and extending around three sides of the magazine, as clearly shown in Fig. 4. The magazine is held in vertical alignment by confinement between parallel beads 64, secured to the inner face of the rear edge 20; and these beads extend up sufficiently high to form side supports for the feed magazine C when it is mounted inside of the case as shown in Fig. 3. A similar bead 65 connects across the top of beads 64 to likewise engage the top edge of the magazine C when it is mounted within the case A, as shown in Fig. 3.

The film J is actuated in its course through the device, from the feed magazine C to the takeup magazine D, by means of the film actuating sprocket 43 rigidly mounted upon a shaft 66, which in turn is revolubly journaled in bearing members 67 secured to the face of the partition 28 within the exposure chamber 29. The film actuating sprocket 43 is mounted just below the exposure aperture 32, and the partition 28 is apertured to allow the extension of the teeth 43ª through and engage the perforations of the film J to draw it downwardly between the adjacent faces of the pressure plate 36 and the beads 42 surrounding the aperture 32. I have hereinbefore explained the manner in which the sprocket 43 cooperates with the block 42, on the aperture gate 33, in its film engaging operation.

The sprocket 43 is actuated in its film moving function by means of the well known Geneva stop movement, comprising a star wheel 68 rigidly mounted upon one end of the shaft 66 in engageable relation with a pin wheel 69 rigidly mounted upon a shaft 70. Shaft 70 is revolubly journaled at one end in the partition 31 and at its opposite in a supporting plate 71; the latter supported upon the partition 31 by means of pins 72. The star wheel 68 has four races 73, spaced 90° apart, and the pin wheel 69 is provided with a single pin 74, so that the ratio between the two will be four to one, that is, four revolutions of the pin wheel to one revolution of the star wheel. The usual means is provided for holding the star wheel 68 against rotation except when the pin 74 is in engagement with one of the races 73. The pin wheel 69 is driven through the medium of a spur gear 75, keyed to the shaft 70, and meshing with a larger spur gear 76 keyed upon a shaft 77; the latter being journaled at one end in the partition 31 and at its opposite end in the plate 71. The gear 76 is driven by its meshing with a main drive gear 78; the latter being keyed upon a main drive shaft 79; the latter being journaled in a bearing in the partition 31 and another bearing in the side 16 of the case A. The shaft 79 extends through the side 16 of the case A and is arranged for the reception of a suitable hand crank 80, by means of which the film actuating mechanism is operated. The main drive gear 78 is provided with a suitable belt groove 81 for the reception of the belt 57, and by means of which the shaft 55, of the takeup magazine, is operated through the medium of the pulley 56.

A shutter, generally designated by the numeral 82, is mounted upon a shaft 83, within the exposure chamber 29, and is arranged to rotatively cut the axis of the projection lens organization G and the exposure aperture 32 during the operation of the device; and is timed, relative to the actuating movements of the sprocket 43, to properly intercept the light rays passing through said aperture and lens during the downward movement of the film J. The shaft 83 is revolubly journaled in a suitable bearing 84 supported upon the partition 28; it extending through said partition and provided on the end which extends through the film chamber 30 with a spiral gear 85, keyed thereon, and which spiral gear meshes with a similar gear keyed upon a shaft 87 extending axially at right angles to the shaft 83, the latter extending axially longitudinal of the case A, and to one side of the axes of the lens organization G and exposure aperture 32. The shaft 87 is similarly journaled at one end in the partition 31 and at its other end in the plate 71. The shutter 82 is rotatably driven through the medium of the aforementioned mechanism and by means of a small spur gear 88, keyed upon the shaft 87, meshing with a larger spur gear 89 keyed upon a shaft 90; the latter also revolubly journaled in bearings in the partition 31 and plate 71. The gear 89 is driven through the medium of the gear 76 meshing with a smaller spur gear likewise keyed upon the shaft 90, as illustrated in dotted lines in Fig. 5.

While the film J is intermittently actuated in its course past the exposure aperture 32 through the medium of the sprocket 43 and the Geneva stop mechanism hereinbefore described, operated by the hand crank 80, it is also fed to and from the intermittent actuating mechanism by means of two constantly driven sprockets 91 and 92, mounted within the film chamber 30, the former keyed upon a shaft 93 and the latter keyed upon the main drive shaft 79. The sprocket 91 serves to draw the film from the feed magazine C and feed it at the upper end to the intermittent actuating mechanism; while the sprocket 92 receives the film from this actuating mechanism and feeds it to the takeup magazine D; it being properly wound upon the reel in the last mentioned magazine through the medium of the belt driven pulley 56, hereinbefore described. The sprocket 92 is, of course, driven by the main drive shaft 79 while the sprocket 91 is driven through the medium of a spur gear 94, keyed upon the shaft 93, and meshing with the spur gear 91 upon the shaft 90. Shaft 93 is similarly journaled in suitable bearings in the partition 31 and plate 71. The film J, in its course through the machine, is held in proper contact with the sprockets 91 and 92, so that the teeth thereof will properly engage the perforations, by means of contact rollers 95 and 96, revolubly mounted upon lever arms 97 and 98, respectively; the latter pivotally mounted upon the partition 91 by means of pivot screws 99 and 100, respectively. A yielding force is exerted to properly hold the rollers 95 and 96 in contact with the peripheries of the sprockets 91 and 92, by means of a contractile spiral spring 101 connected between arms 97 and 98, as clearly shown in Fig. 2. The presure rollers 95 and 96 are identical, being illustrated in Fig. 12; being provided with peripheral grooves 102 so that their normal peripheries will engage the peripheries of the sprocket to hold the film J in contact therewith, and permit the passage of the sprocket teeth. Stops 103 are mounted on the partition 31, to be engaged by the arm 97 and 98 to limit the contactual pressure of the rolls 95 and 96 with the sprockets 91 and 92. An additional contact roller 104, similar to rollers 95 and 96, is mounted adjacent the periphery of the sprocket 92, to insure proper engagement of the film J with its periphery. The roller 104 is substantially an idler roller and is loosely mounted upon a pin shaft 105 supported upon the lever arm 98. An idler roller 106 is likewise mounted adjacent the sprocket 91; being revolubly mounted on a pin shaft 107, also supported by the partition 31. This roller merely serves as a guide to properly direct the film J so that it will not be unduly abraded by an angular engagement with the upper edge of the plate 36.

The shutter 82 is made adjustable so that it may be utilized both for the taking of pictures and for their projection. The details of this shutter are illustrated in Figs. 6, 7 and 8, the arrangement shown in Fig. 6 being for the taking of pictures while the arrangement shown in Fig. 7 illustrates the manner in which it is adjusted for their projection. It comprises a relatively stationary segment 82$^a$ and a relatively movable segment 82$^b$; the former being adapted to be rigidly mounted upon the shaft 83 while the latter is adjustably movable relative thereto. The segment 82$^a$ has a central circular portion 108 upon which is rigidly mounted a circular hub member 109 by means of suitable screws 110. The segment 82$^b$ has a similar central circular portion 111 in which a circular aperture 112 is cut and which aperture conforms to the periphery of the hub 109 so that it may be rotatable thereon. The segment 82$^b$ is limited in its rotatable adjustment, relative to the segment 82$^a$, by means of a concentric slot 113 being cut in the portion 111 and in which a pin 114, mounted upon the central portion 108, engages. The segment 82$^a$ is adapted to be rigidly mounted upon the end of the shaft 83 and the segment 82$^b$ held in adjustable relation relative thereto by means of a thumb nut 115 screwthreadedly mounted on the shaft to clamp the segment 82$^b$, by its central portion 111 into a frictional engagement with the portion 108 of the segment 82$^a$. Each of the segments 82$^a$ and 82$^b$ cover 90° of a circle, so that when they are in the adjusted position shown in Fig. 6 they will cover substantially 180° of a circle for the taking of the pictures, and when in the adjusted position shown in Fig. 7 90° of a circle; the latter arrangement being provided to give a balanced exposure during the projection of the film and the former to give the proper exposure and coverage for the taking of the pictures.

The projection lens organization G may be of any suitable design and arrangement for properly accomplishing the desired results. The arrangement I have here shown is well suited to accomplish my purpose, and consists of a suitable lens mounting or barrel 116 containing the usual lens 117; the mounting 116 being mounted at its inner end in the inner end of the tubular hood member 118. The tube 118 is mounted axially slidable in a tubular carrier 119; this carrier being provided at its outer end with a split clamp, generally designated by the numeral 120, for holding the tube 118 in axial adjustment therein. The inner end of the carrier 119 is externally screw threaded (see Fig. 2) so that it may be removably mounted in an internally screwthreaded bearing ring 121 rigidly mounted in the door 26. An annular flange 122 surrounding the carrier 119 engages the bearing ring 121 to form a light tight connection therewith.

The lamp housing E is preferably of the relative size and configuration illustrated in the drawings, being constructed of any suitable non-inflammable material and preferably having an asbestos lining 123. A removable bottom 124, secured to the housing proper by means of suitable screws 125, carries a socket 126 rigidly mounted thereon, in which a light globe 127 is mounted. The bottom 124 is made removable in order that the globe 127 may be inserted or replaced. An aperture 127$^a$ is provided in the bottom 124 through which an electrical connector may extend for supplying electrical energy to the globe 127. Suitable apertures 129 are provided in the top of the housing to permit the escape of heat generated by the globe 127. A circular aperture 130 is cut in one side of the housing E and a flange 131 turned up around this aperture to make a close fit in a corresponding aperture 132 cut in the rear wall 20 of the case A. The aperture 132 is in axial alignment with the lens organization G and apertures 32 and 35. The asbestos lining 123 of the housing 80 is cut away around the aperture 130, as illustrated in Fig. 2. The housing E is removably mounted upon the rear face 20 of the case A (see Fig. 9) by means of a pair of lugs 133, formed upon or integral with the housing E, engaging spring clips 134 rigidly mounted upon the rear face of the rear end 20, as by means of screws 135. The configuration of the clip 134 is clearly shown in Figs. 1 and 9; and they are mounted in opposed relation (see Fig. 9) so that the lugs 133 enter them from opposite directions. In this manner when the housing E is mounted upon the case A, the flange 131 is extended into the aperture 132 (the two making a close sliding fit) and then the whole housing is rotated to bring the lugs 133 under the spring ends of the clips 134, where the housing is rigidly held due to the resilient action of the clips.

The condenser lens organization F may be of any suitable arrangement and design capable of accomplishing the desired results. I have here shown an arrangement suitable for the purpose, consisting of a cylindrical carrier member 136 in which suitable lenses 137 are rigidly mounted. The circumference of the carrier 136 is such that it will likewise make a close fit in the aperture 132; and it is provided with an annular flange 138 for engaging the inner face of the rear walls 20 in order to make as rigid connection as possible. The carrier 136 is provided with diametrically opposed lugs 139 (similar to the lugs 133 in the lamp housing E) engageable by suitably spaced spring clips 140, secured to the inner face of the rear wall 20, as shown in Figs. 4 and 13. The condenser F is thus removably mounted in the aperture 132, by extending the end 136ª therein (which forms a close sliding fit with the aperture) and rotating it until the lugs 139 are engaged by the spring clips 140.

When the device is utilized as a projector the arrangement of parts are as described in connection with Figs. 1 and 2; the lens organization G being mounted in the front door 26, the lamp housing E and condenser lens F being mounted on the rear side 20, and the feed magazine C mounted upon the top 17. When it is utilized as a camera the photographic lens H is mounted in the annular bearing 121 in the front door 26 it being externally screwthreaded, as at 141, and provided with an annular flange 142 for this purpose; the feed magazine C is mounted within the case A, on top of the magazine D, as shown in Fig. 3; the lamp housing E and condenser lens F being removed and the aperture 132 being closed by a plug 143. The plug 143 is of a diameter to completely cover the aperture 132, in engagement with the outer face of the end 20, and has an annular flange 144 to extend into this aperture and it is retained in this position by means of lugs 145, formed integral therewith, engaging the spring clip 134, as described in connection with the mounting of the lamp housing E, a suitable knurled head being formed on the plug 143 by means of which it may be thus conveniently adjusted to close the aperture 132. When the device is used as a projector the shutter 82 is arranged as illustrated in Fig. 7 and when it is adapted for use as a camera the shutter is arranged as illustrated in Fig. 6; this adjustment being made through the door 26 as hereinbefore described. When the device is utilized as a camera a suitable flexible handle 147 may be attached for carrying; the attachment being effected by the handle being slotted and adjusted to suitable buttons 148 secured to the top 17. By making the feed magazine C removable and providing for its mounting on top of the case A when the device is utilized as a projector, the space otherwise occupied by it inside of the case may be utilized for mounting the condenser F; and when the device is used as a camera this space may be conveniently occupied by the magazine C, thus tending to a more compact and convenient arrangement for transportation.

The gear ratios of the operating mechanism are such that the main drive gear 78 will be rotated at the rate of four revolutions per second; and the ratio between the gears 76 and 78 being two to one the former will be rotated at the rate of eight revolutions per second. The ratio between gears 75 and 76 being two to one the pin wheel 69 will be rotated at the standard rate of 16 revolutions per second. The ratio between the pin wheel 69 and star wheel 68 being four to one and the film moving sprocket 43 being approximately three inches in circumference, a standard movement of twelve inches of film or sixteen exposures will be made per second. The ratio between the gears 88 and 89 being two to one, and the ratio between the gears 85 and 86 being one to one, the shutter 82 will also be rotated at the rate of sixteen revolutions per second. The gear 91 serving as a pinion between the gears 76 and 94 the latter will be rotated at the rate of eight revolutions per second; the circumference of the sprocket 91 being such as to feed twelve inches of film per second to the intermittent film actuating mechanism. The main drive shaft 79 being rotated at the rate of four revolutions per second, the sprocket 92 will also be of such a circumference as to pass twelve inches of film per second. And similarly the ratio between the gears 78 and pulley 56 will be such that the takeup reel in the magazine D will handle the film as it is received from the sprocket 92.

When it is desired to use the device as a printer the film magazines C and D are arranged as illustrated in Fig. 2 and unexposed film from the reel in magazine C is arranged over sprocket 91, through the movement or film actuating mechanism B, over the sprocket 92, and is attached to a takeup reel in magazine D. In passing from the magazine C into the case A, the unexposed film passes through a suitable housing or tube 300 mounted on the top of the case, A connecting apertures 61 and 61ª in the magazine C and case A, respectively. The negative film, through which the print is to be made, is carried on a reel 305 carried by a bracket 306 removably mounted on the top of the case A. The negative film from reel 305 is arranged so that it enters the case A through a suitable opening 302, passes over sprocket 91, passes through the film actuating mechanism B in front of the unexposed film, passes over sprocket 92, passes through a suitable opening 307 in partition 28, and passes out of the casing A through a suitable opening 308 in the front wall 19 thereof. Openings 302, 307, and 308 are each lined with a suitable non-abrasive fabric to protect the film surface; and openings 302 and 308 have covers 309 and 310, respectively, hingedly mounted on the case A adjacent them, to shut out light when they are not in use.

During printing the lens carrier is removed from the opening in the front door 26 and a suitable light is arranged in front of this opening so that it will shine therethrough and fall upon the films in the operating mechanism B through the exposure aperture 32. It is preferred that the aperture in the front wall of the case A be unrestricted during the printing operation. The shutter may be removed or left in place as desired. When the device is being used as a printer the operating mechanism B is operated at a speed which will allow for proper printing of the unexposed film through the negative.

Having described a preferred form of my invention, I claim:

1. In a combined motion picture camera and projector, the combination with a case containing a film actuating mechanism and a front lens organization mounted therein, of an aperture in said case in axial alignment with said lens, a condenser removably mounted within the case in said aperture, a lamp housing containing an illuminant removably mounted exterior of the case to project light through said aperture, closure means for said aperture when the condenser and lamp housing are removed, film magazines removably mounted within the case, means for removably mounting one of said magazines exterior of the case; the last mentioned magazine when mounted in the case occupying the space otherwise occupied by the removable condenser.

2. In a combined motion picture camera and projector, a case containing a film actuating mechanism, a front lens, a condenser removably mounted in the case behind the film, film magazines and mountings therefor in the case, one of the mountings removably supporting one of the magazines in the space otherwise occupied by the condenser, and a mounting for that magazine exterior of the case.

3. In a device of the character described, a case containing film actuating mechanism, a film magazine exterior of the case, a mounting for the magazine on the outside of the case including side confining strips and an end abutment flange, and a curved film passage member leading from the abutment strip longitudinally and downwardly into the case.

In witness that I claim the foregoing I have hereunto subscribed my name this 14th day of April, 1922.

ABE E. ROSENBERG.